(12) United States Patent
Huang

(10) Patent No.: US 8,324,854 B2
(45) Date of Patent: Dec. 4, 2012

(54) FAN CONTROL SYSTEM

(75) Inventor: Yong-Zhao Huang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/442,880

(22) Filed: Apr. 10, 2012

(65) Prior Publication Data

US 2012/0194116 A1 Aug. 2, 2012

Related U.S. Application Data

(62) Division of application No. 12/639,006, filed on Dec. 16, 2009, now Pat. No. 8,174,227.

(30) Foreign Application Priority Data

Oct. 20, 2009 (CN) .......................... 2009 1 0308506

(51) Int. Cl.
*G05D 23/00* (2006.01)

(52) U.S. Cl. .................. 318/472; 318/445; 318/471

(58) Field of Classification Search .................. 318/445, 318/471, 472

See application file for complete search history.

(56) References Cited

U.S. PATENT DOCUMENTS

| | | | | |
|---|---|---|---|---|
| 4,434,749 A * | 3/1984 | Morita et al. | ............. | 123/41.02 |
| 4,813,241 A * | 3/1989 | Hurutachi et al. | ............. | 62/209 |
| 5,457,766 A * | 10/1995 | Ko | ................ | 388/831 |
| 6,380,704 B1 * | 4/2002 | Chin | ............... | 318/268 |
| 6,396,231 B1 * | 5/2002 | Horng et al. | ................. | 318/471 |
| 6,407,525 B1 * | 6/2002 | Horng et al. | ................. | 318/473 |
| 7,103,293 B2 * | 9/2006 | Yamaguchi | ................ | 399/33 |
| 7,579,794 B2 * | 8/2009 | Chang et al. | ............. | 361/679.48 |
| 7,796,867 B2 * | 9/2010 | Miyajima et al. | ............ | 388/811 |
| 2005/0047762 A1 * | 3/2005 | Liu et al. | .................... | 388/806 |
| 2006/0109627 A1 * | 5/2006 | Lee | ................ | 361/695 |
| 2007/0116553 A1 * | 5/2007 | Chen et al. | .................... | 415/47 |
| 2007/0133955 A1 * | 6/2007 | Hsu et al. | .................... | 388/811 |
| 2007/0224030 A1 * | 9/2007 | Chang et al. | .................... | 415/47 |
| 2009/0096402 A1 * | 4/2009 | Miyajima et al. | ............ | 318/473 |
| 2009/0295458 A1 * | 12/2009 | Kameyama et al. | ......... | 327/512 |
| 2011/0101903 A1 * | 5/2011 | Huang | .......................... | 318/472 |

* cited by examiner

*Primary Examiner* — Kawing Chan
(74) *Attorney, Agent, or Firm* — Altis Law Group, Inc.

(57) ABSTRACT

A fan control system includes a temperature detecting circuit and a rotation rate control circuit. The detecting circuit includes a first amplifier, a second amplifier, and a thermistor. The rotation rate control circuit includes a first terminal, a second terminal, and a third terminal. The detecting circuit detects temperature and outputs a voltage signal. The rotation rate control circuit receives the voltage signal and controls the rotation rate of the fan according to the voltage signal.

2 Claims, 4 Drawing Sheets

FAN CONTROL SYSTEM

CROSS REFERENCE TO RELATED APPLICATIONS

This present application is a divisional application of U.S. patent application, entitled "FAN CONTROL SYSTEM", with application Ser. No. 12/639,006, filed on Dec. 16, 2009, which claims foreign priority based on Chinese Patent application No. 200910308506.8, filed in China on Oct. 20, 2009. The contents of the above-referenced applications are hereby incorporated by reference. Relevant subject matter is disclosed in the co-pending U.S. patent application Ser. No. 13/442,881 having the same title and assigned to the same assignee as named herein.

BACKGROUND

1. Technical Field

The present disclosure relates to a control system for a fan.

2. Description of Related Art

The demand for electrical power is no greater than the demand for the efficient use of electrical power. Fans used to dissipate heat can consume a lot of power and waste power if they are operating faster than needed. Therefore, a precise control over fan speed to conserve energy meanwhile ensuring proper heat dissipation is desired.

DETAILED DESCRIPTION

Figure 1:
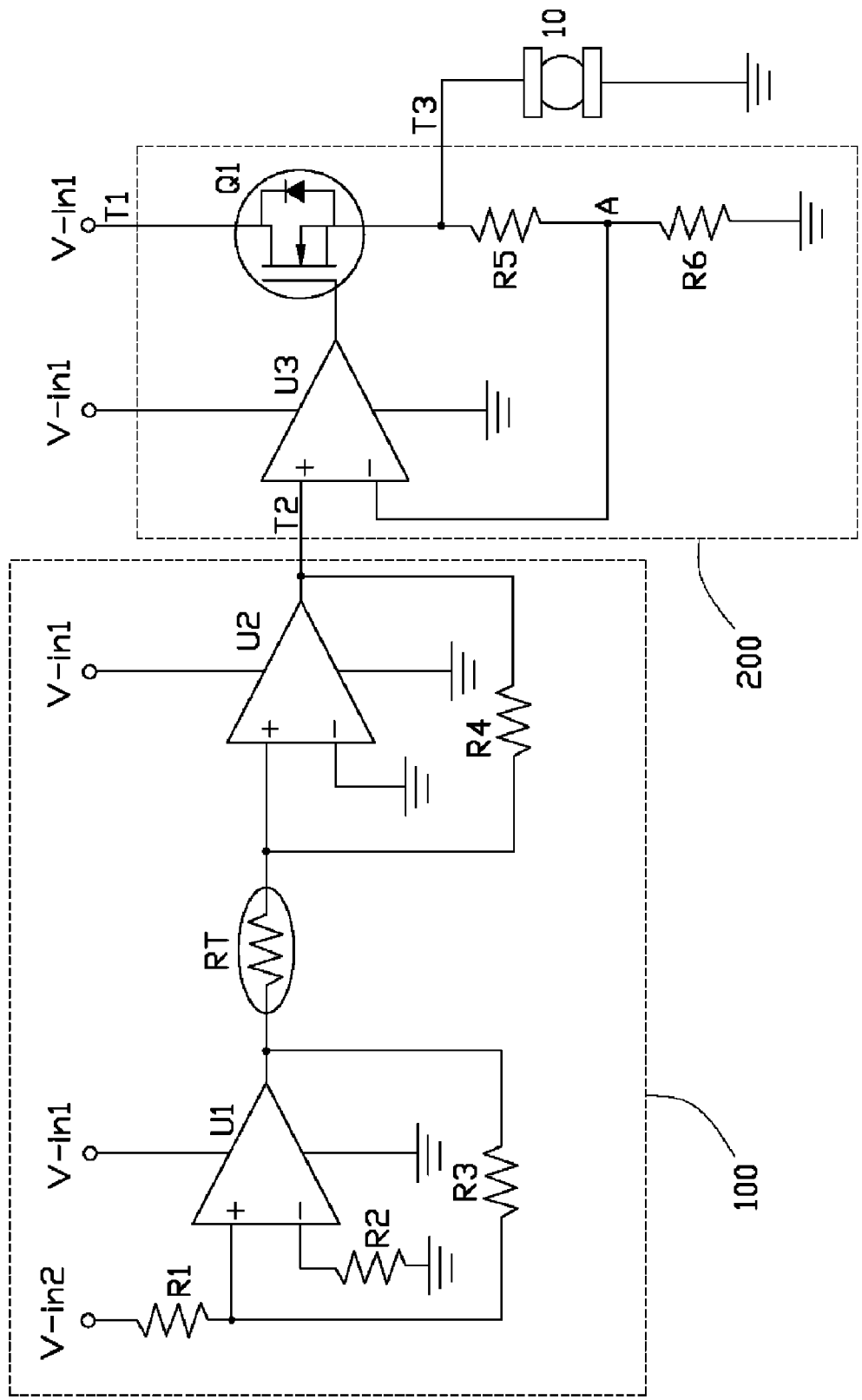
FIG. 1 is a circuit diagram of a first embodiment of a fan control system.

Referring to FIG. 1, a first embodiment of a fan control system for controlling a rotation rate of a fan 10 of an electronic device includes a temperature detecting circuit 100 and a rotation rate control circuit 200.

The detecting circuit 100 is configured to detect temperature in an enclosure housing the fan 10 of the electronic device, and to convert the temperature to a voltage signal.

The control circuit 200 includes a first terminal T1 connected to a first power supply V-in1, a second terminal T2 connected to the detecting circuit 100, and a third terminal T3 connected to a first end of the fan 10. A second end of the fan 10 is grounded. The control circuit 200 receives the voltage signal from the detecting circuit 100, and controls the rotation rate of the fan 10 according to the voltage signal.

The detecting circuit 100 includes a first amplifier U1, a second amplifier U2, a thermistor RT, and resistors R1~R4. The thermistor RT is a negative temperature coefficient thermistor.

A non-inverting input of the first amplifier U1 is connected to a second power supply V-in2 through the resistor R1. An inverting input of the first amplifier U1 is grounded through the resistor R2. An output of the first amplifier U1 is connected to the non-inverting input of the first amplifier U1 through the resistor R3. The output of the first amplifier U1 is also connected to a non-inverting input of the second amplifier U2 through the thermistor RT. An inverting input of the second amplifier U2 is grounded. An output of the second amplifier U2 is connected to the non-inverting input of the second amplifier U2 through the resistor R4.

Power terminals of the first amplifier U1 and the second amplifier U2 are connected to the first power supply V-in1. Ground terminals of the first amplifier U1 and the second amplifier U2 are grounded.

The control circuit 200 includes a third amplifier U3, a metal oxide semiconductor field effect transistor (MOSFET) Q1, and resistors R5 and R6.

A drain of the MOSFET Q1 functions as the first terminal T1 of the control circuit 200. A source of the MOSFET Q1 functions as the third terminal T3 of the control circuit 200, and is also grounded through the resistors R5 and R6 in series. A non-inverting input of the third amplifier U3 functions as the second terminal T2 of the control circuit 200, to connect to the output of the second amplifier U2 of the detecting circuit 100. A node between the resistors R5 and R6 is labeled "A". An inverting input of the third amplifier U3 is connected to the node A. An output of the third amplifier U3 is connected to a gate of the MOSFET Q1. A power terminal of the third amplifier U3 is connected to the first power supply V-in1. A ground terminal of the third amplifier U3 is grounded.

The first amplifier U1 and the resistor R3 function as a deep negative feedback circuit. The first amplifier U1 is equivalent to an ideal amplifier. A current Ii through the resistor R1 is equal to a current Io through the resistor R3. The relationship of a voltage Uo1 of the output of the first amplifier U1, the current Io through the resistor R3, the current Ii through the resistor R1, a voltage of the second power supply V-in2, and resistance of the resistors R1 and R3 is $Ii=V\text{-}in2/R1=Io=Uo1/R3$.

The relationship of the voltage Uo1 of the output of the first amplifier U1, the voltage of the second power supply V-in2, and resistance of the resistors R1 and R3 is $Uo1=V\text{-}in2\times R3/R1$.

The relationship of a voltage Uo2 of the output of the second amplifier U2, the voltage Uo1 of the output of the first amplifier U1, and resistance of the resistor R4 and the thermistor RT is $Uo2=Uo1\times R4/RT$.

The relationship of the voltage Uo2 of the output of the second amplifier U2, the voltage of the second power supply V-in2, and resistance of the resistors R1, R3, R4 and the thermistor RT is $Uo2=V\text{-}in2\times R3\times R4/(R1\times RT)$.

The resistance of the thermistor RT decreases when the temperature in the enclosure housing the fan 10 increases. The voltage Uo2 of the output of the second amplifier U2 increases accordingly. The third amplifier U3 compares a voltage Va of the node A and the voltage Uo2 of the output of the second amplifier U2. A voltage of the output of the third amplifier U3 increases when the voltage Uo2 of the output of the second amplifier U2 increases. A voltage of the gate of the MOSFET Q1 is equal to the output of the third amplifier U3 and increases accordingly. The current of the source of the MOSFET Q1 increases accordingly to step up the rotation rate of the fan 10 to counteract the increased temperature in the enclosure.

The resistance of the thermistor RT increases when the temperature in the enclosure housing the fan 10 decreases. The voltage Uo2 of the output of the second amplifier U2 decreases accordingly. The third amplifier U3 compares the voltage Va of the node A and the voltage Uo2 of the output of the second amplifier U2. The voltage of the output of third amplifier U3 decreases when the voltage Uo2 of the output of the second amplifier U2 decreases. The voltage of the gate of the MOSFET Q1 decreases accordingly. The current of the source of the MOSFET Q1 decreases accordingly to slow down the rotation rate of the fan 10.

Figure 2:
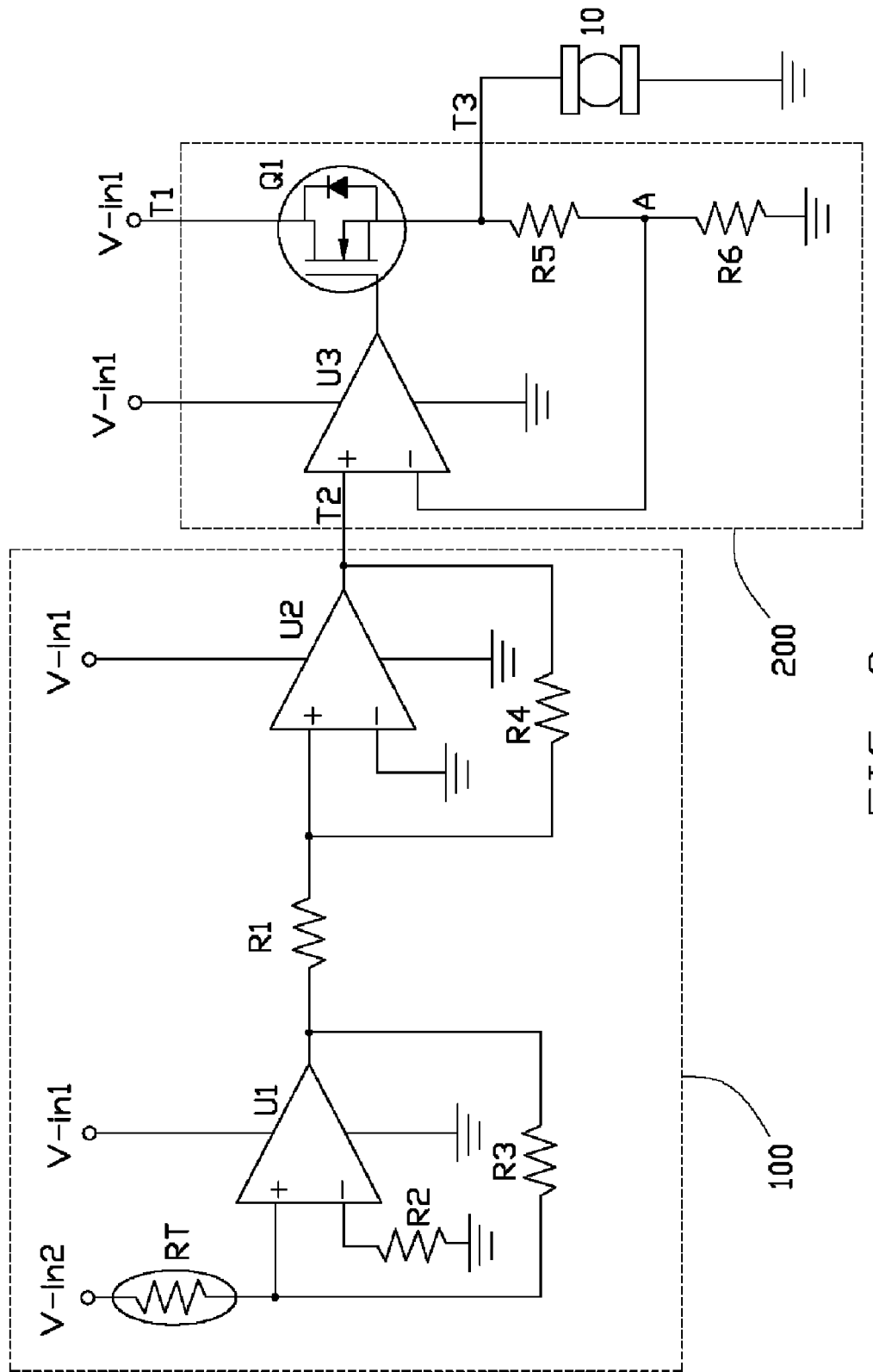
FIG. 2 is a circuit diagram of a second embodiment of a fan control system.

Referring to FIG. 2, in a second embodiment of a fan control system, the thermistor RT may be interchanged with the resistor R1.

Figure 3:
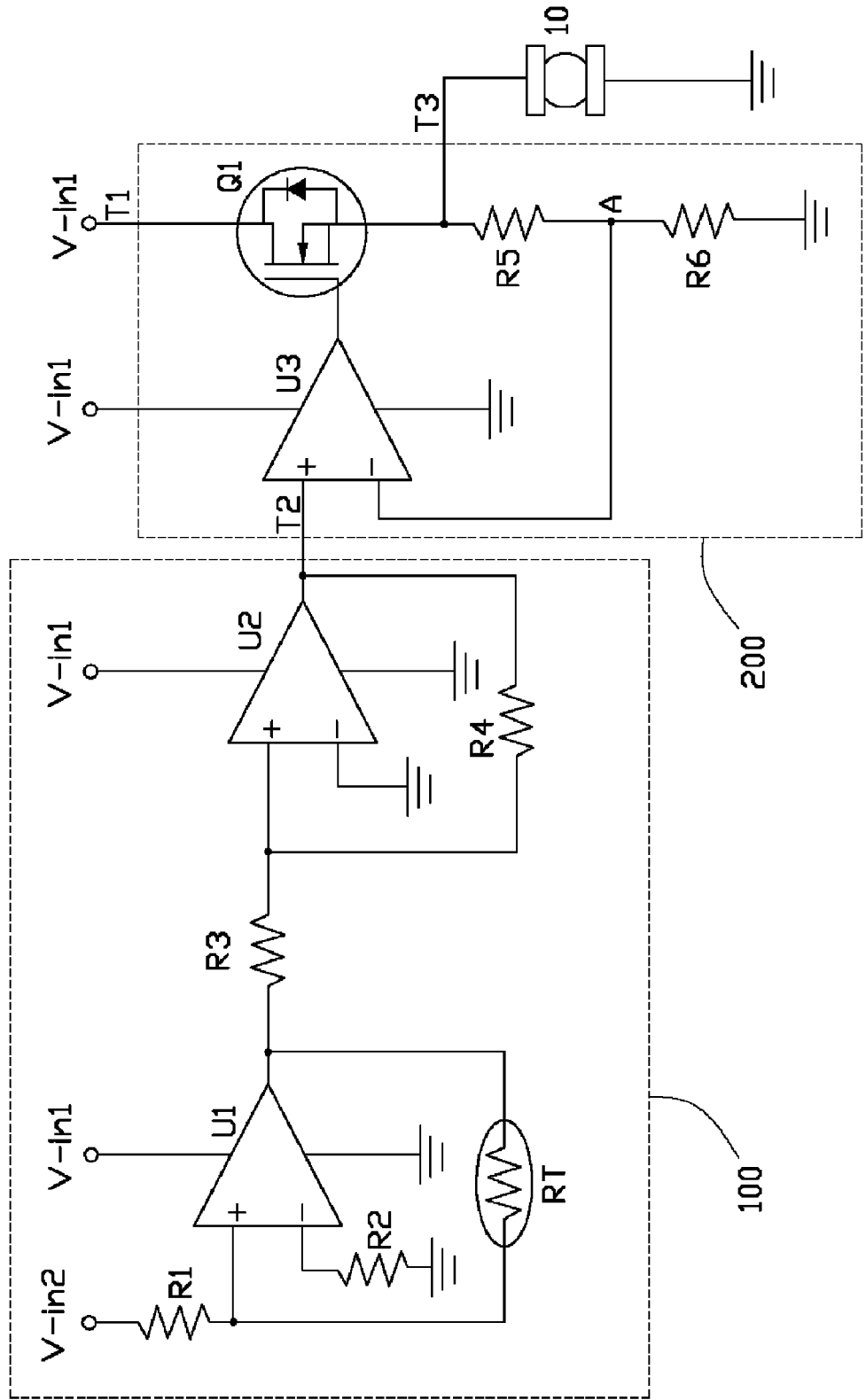
FIG. 3 is a circuit diagram of a third embodiment of a fan control system.
Figure 4:
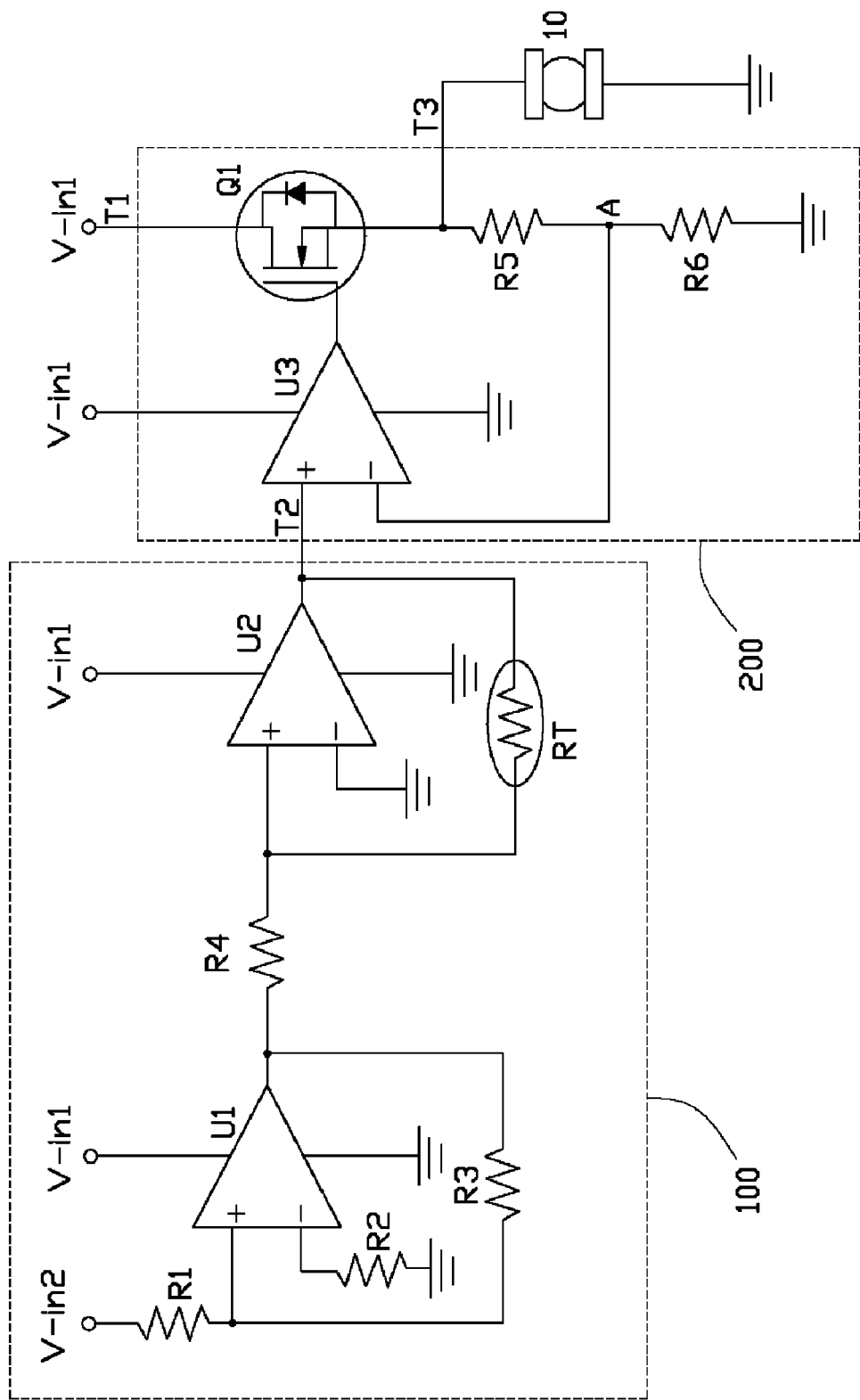
FIG. 4 is a circuit diagram of a fourth embodiment of a fan control system.

Referring to FIG. 3 and FIG. 4, in a third or fourth embodiment of a fan control system, the thermistor RT may be interchanged with the resistor R3 or the resistor R4 if the thermistor RT is a positive temperature coefficient thermistor.

The foregoing description of the exemplary embodiments of the disclosure has been presented only for the purposes of illustration and description and is not intended to be exhaustive or to limit the disclosure to the precise forms disclosed. Many modifications and variations are possible in light of the above. The embodiments are chosen and described in order to explain the principles of the disclosure and their practical application so as to enable others of ordinary skill in the art to utilize the disclosure and various embodiments and with such various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than by the foregoing description and the exemplary embodiments described therein.

What is claimed is:

1. A fan control system, comprising:

a temperature detecting circuit comprising a first amplifier, a second amplifier, and a thermistor, wherein power terminals of the first amplifier and the second amplifier are to be connected to a first power supply, ground terminals of the first amplifier and the second amplifier are to be grounded, a non-inverting input of the first amplifier is to be connected to a second power supply through the thermistor, an inverting input of the first amplifier is to be grounded through a first resistor, an output of the first amplifier is connected to the non-inverting input of the first amplifier through a second resistor, the output of the first amplifier is also connected to a non-inverting input of the second amplifier through a third resistor, an inverting input of the second amplifier is to be grounded, an output of the second amplifier is connected to the non-inverting input of the second amplifier through a fourth resistor, the output of the second amplifier outputs a voltage signal; and a rotation rate control circuit comprising a first terminal connected to the first power supply, a second terminal connected to the output of the second amplifier to receive the voltage signal, and a third terminal connected to the fan, to control the rotation rate of the fan according to the voltage signal.

2. The fan control system of claim 1, wherein the rotation rate control circuit comprises a third amplifier, and a metal oxide semiconductor field effect transistor (MOSFET), a drain of the MOSFET functions as the first terminal of the rotation rate control circuit, a source of the MOSFET functions as the third terminal of the rotation rate control circuit, the source of the MOSFET is to be grounded through a fifth resistor and a sixth resistor in series, a non-inverting input of the third amplifier functions as the second terminal of the rotation rate control circuit, an inverting input of the third amplifier is connected to a node between the fifth resistor and the sixth resistor, an output of the third amplifier is connected to a gate of the MOSFET, a power terminal of the third amplifier is to be connected to the first power supply, a ground terminal of the third amplifier is to be grounded.

* * * * *